UNITED STATES PATENT OFFICE.

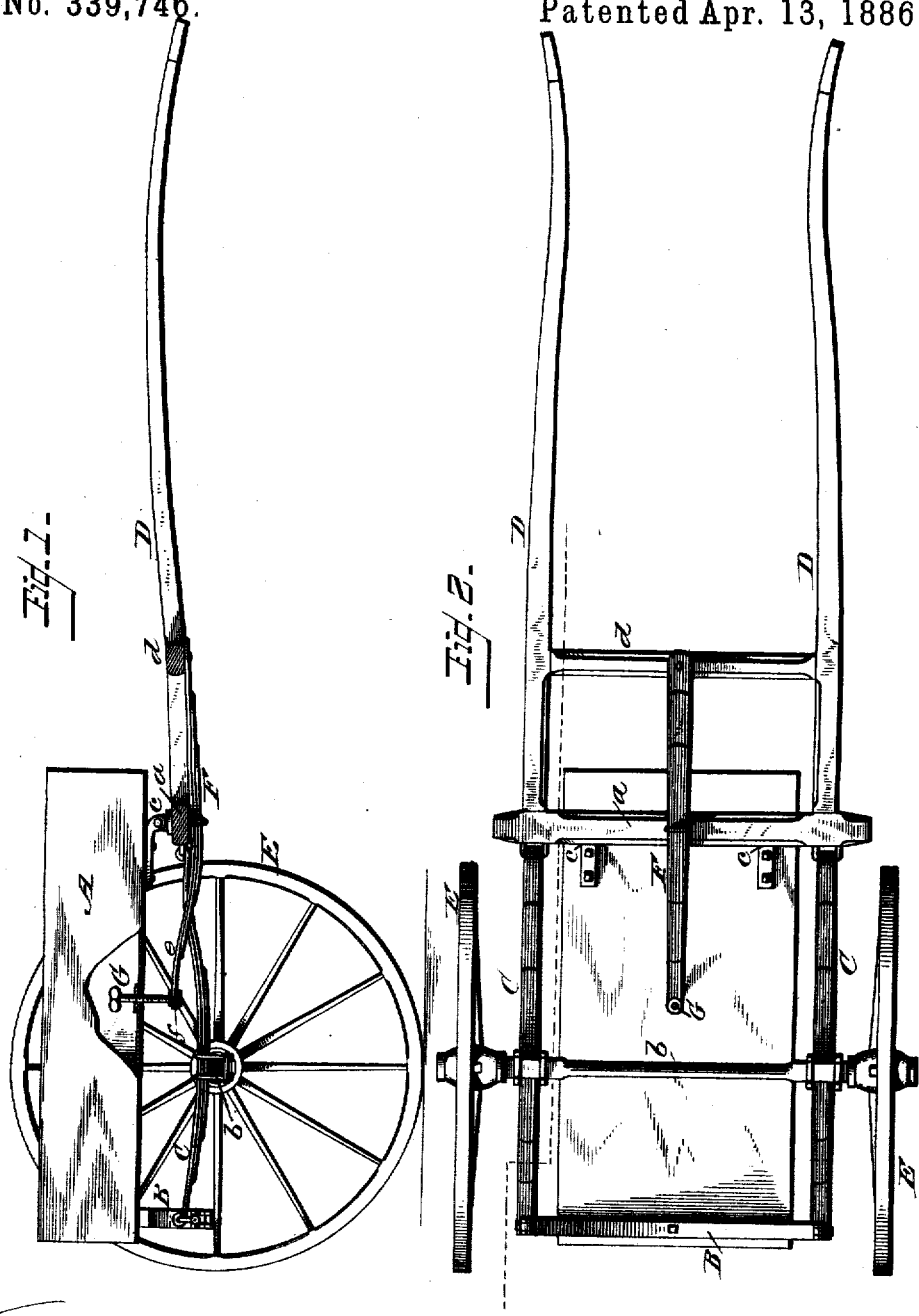

LEANDER L. DUNBAR, OF LYNN GROVE, INDIANA.

TWO-WHEELED VEHICLE.

SPECIFICATION forming part of Letters Patent No. 339,746, dated April 13, 1886.

Application filed October 31, 1885. Serial No. 181,498. (No model.)

*To all whom it may concern:*

Be it known that I, LEANDER L. DUNBAR, a citizen of the United States, residing at Lynn Grove, in the county of Adams and State of Indiana, have invented certain new and useful Improvements in Vehicles; and I do hereby declare that the following is a full, clear, and exact description of the same, reference being had to the annexed drawings, making a part of this specification, and to the letters and figures of reference marked thereon.

Figure 1 of the drawings is a longitudinal section of my invention, and Fig. 2 an under side plan view thereof.

The present invention has relation to certain new and useful improvements in road carts or wagons and other vehicles; and the object thereof is to provide means whereby the motion imparted to the vehicle by that of the horse is overcome, and means also provided for adapting the vehicle to different-sized horses. These objects I attain by the construction substantially as shown in the drawings, and hereinafter described and claimed.

In the accompanying drawings, A represents the box of the cart or wagon, supported at its rear end by transverse spring B, of any desirable construction. The side springs, C, which may also be of any suitable form, at their rear ends are connected to the spring B by links, as shown, or other preferred means, while the forward ends of said springs are attached to the cross-bar $a$ of the shafts D in such manner as will allow the shafts to be raised or lowered. The side springs, C, are connected to the axle $b$, upon the ends of which are mounted the wheels E. The forward or front end of the box A is hinged to the cross-bar $a$, as shown at $c$, thus enabling the shaft to be moved either up or down without interfering with the wagon-box.

To the cross-bar $d$ of the shafts D is secured the front end of an equalizing-spring, F, which, if preferred, may be a leaf-spring or other form, as found desirable. This spring F is also secured to the cross-bar $a$, and is of sufficient length to extend back some distance under the box A, and the end is curved upward, as shown at $e$, and has a flat bearing extremity, $f$, through which loosely passes the smooth and reduced end of an adjusting-screw, G. A rubber cushion may be employed where the spring connects with the adjusting-screw, so as to increase its elasticity and also prevent noise.

The employment of the equalizing-spring F serves three purposes—viz., to keep the box from falling down or tilting backward, and, being elastic in both directions, from its peculiar shape, and connected to the bottom of the box, it prevents all upward and downward motion of the shafts (occasioned by the trotting of the horse) from jerking or jolting the rider, as is common in two-wheeled vehicles.

By the employment of the adjusting-screw as a means of connecting the equalizing-spring to the box the shafts can be raised or lowered to fit any size horse, and the box always remaining on a level, such adjustment of the shafts being made without necessitating any change in the harness and also by the driver while in his seat, the true horizontal position of the wagon-box at all times making a much neater appearance than when tipped back, and also more comfortable to ride in. It should be understood that this adjustment of the wagon-body and the prevention of the up-and-down motion of the shafts is effected by the single equalizing-spring connected at its front end to the forward cross-bar of the shafts and also to its rear cross-bar, and the opposite end extending under the body at or near its center, and connected to it by means of the adjusting device, thereby dispensing with the use of two springs, as heretofore, which were connected to the rear ends of the shafts and extended along the sides of the wagon-body, and connected thereto, at or near its rear end, by a pin and perforated plates.

Having now fully described my invention, what I claim as new, and desire to secure by Letters Patent, is—

1. In a vehicle, the body or box thereof provided with the side and cross springs, in combination with the shafts hinged to the under side of the body or box near its front end and also to the side springs, and a single equalizing-spring extending centrally under the body or box, and connected thereto at its rear end by an adjusting device and at its forward end to the cross-bars of the shafts, substantially as and for the purpose set forth.

2. In a vehicle, the combination, with the box and shafts hinged together, of an equalizing-spring connected to the cross-bars of the shafts, and an adjusting-screw for attaching the spring to the box, substantially as and for the purpose specified.

In testimony that I claim the above I have hereunto subscribed my name in the presence of two witnesses.

LEANDER L. DUNBAR.

Witnesses:
B. F. FRENCH,
G. W. MUSSER.